United States Patent
Nakazawa et al.

(10) Patent No.: US 7,326,279 B2
(45) Date of Patent: Feb. 5, 2008

(54) METHOD FOR REMOVING HARMFUL SUBSTANCE IN VENT GAS

(75) Inventors: Yasuo Nakazawa, Shibukawa (JP); Moriyuki Fukushima, Shibukawa (JP); Kensuke Suda, Shibukawa (JP); Akira Sekiya, Tsukuba (JP)

(73) Assignees: Kanto Denka Kogyo Co., Ltd., Tokyo (JP); Research Institute of Innovative Technology for the Earth, Kyoto (JP); National Institute of Advanced Industrial Science and Technology, Tokyo (JP)

( * ) Notice: Subject to any disclaimer, the term of this patent is extended or adjusted under 35 U.S.C. 154(b) by 314 days.

(21) Appl. No.: 10/528,355

(22) PCT Filed: Nov. 28, 2003

(86) PCT No.: PCT/JP03/15217

§ 371 (c)(1),
(2), (4) Date: Mar. 18, 2005

(87) PCT Pub. No.: WO2004/050217

PCT Pub. Date: Jun. 17, 2004

(65) Prior Publication Data

US 2006/0032373 A1    Feb. 16, 2006

(30) Foreign Application Priority Data

Nov. 29, 2002   (JP) ............................. 2002-348736

(51) Int. Cl.
*B01D 53/68* (2006.01)

(52) U.S. Cl. ..................................... 95/131; 423/240 S
(58) Field of Classification Search .................. 95/131, 95/132; 96/108; 502/79, 417; 423/240 R, 423/241, 240 S, 489, 503
See application file for complete search history.

(56) References Cited

U.S. PATENT DOCUMENTS

| 5,882,615 | A * | 3/1999 | Fukuda et al. ........... 423/240 S |
| 6,060,034 | A * | 5/2000 | Tsukamoto .............. 423/240 S |
| 6,602,480 | B1 * | 8/2003 | Mori ....................... 423/240 S |
| 6,649,082 | B2 * | 11/2003 | Hayasaka et al. .......... 252/79.1 |
| 6,805,728 | B2 * | 10/2004 | Sweeney et al. .............. 95/133 |
| 2002/0072466 | A1 | 6/2002 | Holder |

FOREIGN PATENT DOCUMENTS

| JP | 01-176450 | | 7/1989 |
| JP | 04-094723 | A * | 3/1992 |
| JP | 04 094723 | A | 3/1992 |
| JP | 04 311570 | A | 11/1992 |
| JP | 08 215539 | A | 8/1996 |
| JP | 10-249157 | | 9/1998 |
| JP | 2000-140576 | | 5/2000 |
| JP | 2001-338910 | | 12/2001 |
| WO | WO 01/89666 | | 11/2001 |

* cited by examiner

*Primary Examiner*—Frank M. Lawrence
(74) *Attorney, Agent, or Firm*—Young & Thompson

(57) ABSTRACT

A method for removing harmful substances in a vent gas containing a halogen or halogen compound gas remaining in the pipeline of a cylinder cabinet, which comprises contacting the vent gas with a treating agent comprising an alkaline earth metal compound, an alkali metal compound, zeolite, and a carbonaceous material.

10 Claims, 1 Drawing Sheet

METHOD FOR REMOVING HARMFUL SUBSTANCE IN VENT GAS

TECHNICAL FIELD

The present invention relates to a method for removing harmful substances in a vent gas containing highly reactive halogen or halogen compound gas remaining in the pipeline of a cylinder cabinet that supplies gas to an etching unit, a CVD unit, etc. used in the manufacture of semiconductors and liquid crystals.

BACKGROUND ART

Halogen or halogen compound gases are used for various purposes as an etchant gas, a cleaning gas, a raw material, etc. in etching and CVD processes in the manufacture of semiconductors and liquid crystals. Such a highly reactive halogen or halogen compound gas is fed from a cylinder cabinet to an etching or CVD unit.

When the cylinder in the cylinder cabinet is replaced, the reactive halogen or halogen compound gas remaining in the pipeline of the cabinet, such as a gas feed pipe, is exhausted as vent gas before the replacement. The vent gas containing the halogen or halogen compound gas is not allowed to be released into the air so that a unit for removing harmful substances from vent gas must be installed.

Wet methods and dry methods are known as methods using a treating agent for removing highly reactive halogen or halogen compound from exhaust gas.

A wet method is a treatment of the exhaust gas with water or an aqueous solution of sodium hydroxide. Treatment (scrubbing) with water is mostly practiced because treatment with an aqueous solution of sodium hydroxide induces different problems such as wafer contamination. In the case of treatment with water, toxic oxidizing gas and acidic gas could be made non-toxic at high efficiency by using a large quantity of fresh water.

Actually, however, treating (scrubbing) water is used in circulation for the time being in view of the amount of waste water. Therefore, toxic gas has been released without being thoroughly removed from vent gas.

A dry method, on the other hand, is a treatment of exhaust gas with a solid treating agent. Various treating agents have been proposed. For example, Japanese Patent 2778031 proposes an adsorbent for nitrogen oxides and sulfur oxides which comprises calcium sulfate, calcium hydroxide, activated carbon, amorphous carbon, and an alkali metal compound. JP-A-2001-338910 discloses a method of treating halogen-containing gas which comprises the steps of bringing the gas into contact with a treating agent containing iron oxide, an alkaline earth metal compound, and activated carbon and bringing the thus treated gas into contact with a treating agent comprising zeolite.

The above-described adsorbent and treating agent use a large quantity of activated carbon with a large specific surface area to enhance the effect of contact with a halogen compound gas. It is true that a large amount of a halogen compound gas is adsorbed on activated carbon. However, because of the high reducing power of activated carbon, an rapid reaction can occur between the halogen compound gas adsorbed onto the treating agent and activated carbon, which induce an explosion.

DISCLOSURE OF THE INVENTION

An object of the present invention is to provide a method for removing harmful substances in the vent gas containing halogen or halogen compound gas remaining in the pipeline of a cylinder cabinet for feeding gas to an etching unit, a CVD unit, etc. used in the manufacture of semiconductors and liquid crystals thereby to render the gas harmless safely and efficiently.

As a result of extensive investigation, the present inventors have found that an activated carbon-containing treating agent having incorporated therein incombustible zeolite has a relatively large specific surface area notwithstanding a reduced content of activated carbon and is capable of removing highly reactive halogen or halogen compound gas, such as $F_2$ or $COF_2$, from vent gas with safety and high efficiency.

Based on the above finding, the present invention provides a method for removing harmful substances in the vent gas containing halogen or halogen compound gas remaining in the pipeline of a cylinder cabinet, characterized by bringing the vent gas into contact with a treating agent comprising an alkaline earth metal compound, an alkali metal compound, zeolite, and a carbonaceous material.

According to the vent gas treating method of the invention, the proportion of activated carbon in the treating agent can be reduced, which avoids explosion. And yet the treating agent has a relatively large specific surface area to enjoy a large effect of contact with vent gas.

BEST MODE FOR CARRYING OUT THE INVENTION

Figure 1:
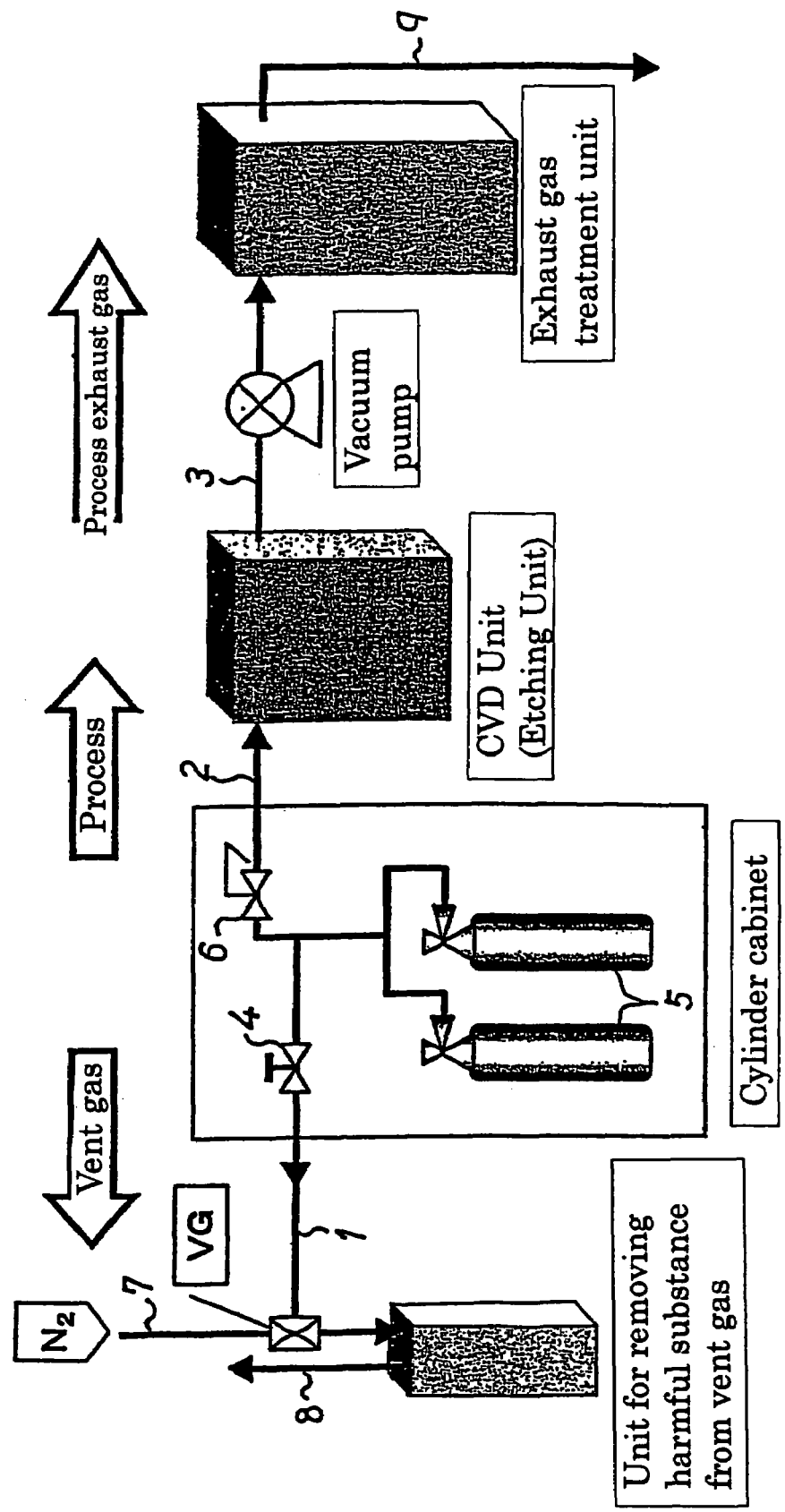
FIG. 1 is a schematic diagram showing an embodiment of the method for removing harmful substances in the vent gas of the present invention.

The method for removing harmful substances in the vent gas of the present invention will be described in detail based on its preferred embodiments with reference to the accompanying drawing.

FIG. 1 shows an embodiment of the system in which a cylinder cabinet supplies highly reactive halogen or halogen compound gas to a CVD (or etching) unit, and vent gas remaining in the pipeline of the cylinder cabinet is treated in a unit for removing harmful substances from vent gas.

The cylinder cabinet is connected to the unit for removing harmful substances from vent gas via a pipe 1 and to the CVD (or etching) unit via a gas feed pipe 2. The CVD (or etching) unit is connected to a vacuum pump via a pipe 3 and then to an exhaust gas treatment unit. A valve 4 in the pipe 1 is closed during gas feed to the CVD (or etching) unit.

When a cylinder 5 in the cylinder cabinet is exchanged for another one, valves of cylinders 5 and a valve 6 in the gas feed pipe 2 are closed, and the valve 4 in the pipe 1 is opened. Nitrogen gas is introduced through a pipe 7, and the halogen or halogen compound gas remaining in the pipeline of the cylinder cabinet is evacuated with the nitrogen gas and introduced into the unit for removing harmful substances from vent gas.

The halogen or halogen compound gas introduced into the unit for removing harmful substances from vent gas is brought into contact with the treating agent to be made harmless and released into the air through a pipe 8.

The treating agent packed in the unit for removing harmful substances from vent gas comprises an alkaline earth metal compound, an alkali metal compound, zeolite, and a carbonaceous material.

The alkaline earth metal compound that can be used in the treating agent includes oxides, hydroxides, carbonates, and sulfates of calcium, magnesium, barium, and strontium. Calcium oxide and hydroxide are particularly preferred of them. These alkaline earth metal compounds can be used either individually or as a combination of two or more thereof.

The alkaline earth metal compound preferably has a particle size of 500 μm or less, still preferably 200 to 300 μm, and a specific surface area of 1 to 10 $m^2/g$, still preferably 2 to 3 $m^2/g$.

The alkali metal compound that can be used in the treating agent includes oxides, hydroxides, carbonates, and sulfates of sodium, potassium, and cesium. Preferred of them are sodium oxide and hydroxide and potassium oxide and hydroxide. These alkali metal compounds can be used either individually or as a combination of two or more thereof.

The alkali metal compound preferably has a particle size of 500 μm or less, still preferably 200 to 300 μm, and a specific surface area of 1 to 10 $m^2/g$, still preferably 2 to 3 $m^2/g$.

Soda lime can be used as the alkaline earth metal compound and the alkali metal compound. Soda lime to be used preferably has a particle size of 500 μm or less, still preferably 200 to 300 μm, and a specific surface area of 1 to 100 $m^2/g$, still preferably 2 to 30 $m^2/g$.

Zeolite that can be used in the treating agent preferably has fine pores with a pore diameter of 3 Å or more, still preferably 8 to 10 Å. In particular, X type zeolite and faujasite type zeolite are preferred for their large void volume in nature of their structures. X type zeolite is still preferred. Having a relatively high silicon dioxide content, faujasite type zeolite is liable to react with hydrogen fluoride to destroy the structure of zeolite. It can follow that the capacity for treating hydrogen fluoride is reduced.

It is preferred for the zeolite to have a particle size of 500 μm or less, still preferably 100 to 300 μm, and a specific surface area of 100 to 500 $m^2/g$, still preferably 200 to 400 $m^2/g$.

The carbonaceous material that can be used in the treating agent is preferably coke and/or activated carbon. Porous coke obtained by high-temperature dry distillation of coal is particularly preferred.

It is preferred for the carbonaceous material to have a particle size of 500 μm or less, still preferably 200 to 300 μm, and a specific surface area of 1000 to 1500 $m^2/g$, still preferably 1100 to 1200 $m^2/g$.

The treating agent preferably comprises 60% or more by mass of the alkaline earth metal compound, 1 to 3% by mass of the alkali metal compound, 5 to 37% by mass of zeolite, and 5% by mass or less of the carbonaceous material. Still preferably, it comprises 70 to 87% by mass of the alkaline earth metal compound, 2 to 3% by mass of the alkali metal compound, 5 to 10% by mass of zeolite, and 0.5 to 5% by mass of the carbonaceous material. It is the most preferred that the treating agent comprise 80 to 87% by mass of the alkaline earth metal compound, 2 to 3% by mass of the alkali metal compound, 5 to 7% by mass of zeolite, and 2 to 5% by mass of the carbonaceous material.

The treating agent may be a mixture as obtained by dry blending the alkaline earth metal compound, alkali metal compound, zeolite, and carbonaceous material each in powder form in the above-recited compounding ratio. It is preferred to formulate the mixture into granules by mixing the powders, preferably powders having a particle size of 500 μm or less, followed by kneading with water, etc., followed by granulation.

It is preferred that the treating agent in the form of granules have a particle size of 1 to 5 mm, still preferably 2 to 4 mm, be porous, and have a specific surface area of 10 to 40 $m^2/g$, still preferably 20 to 30 $m^2/g$.

Kneading of powders and granulation are carried out, for example, as follows.

The components each in powder form are mixed and kneaded with water in, e.g., a Henschel mixer, followed by granulation. Mixing and kneading can be performed with commonly used equipment. A binder may be added in mixing and kneading.

The vent gas that can be rendered harmless by the method of the present invention is one containing highly reactive halogen or halogen compound gas, e.g., $F_2$ or $COF_2$, remaining in the pipeline of a cylinder cabinet that feeds gas to an etching unit, a CVD unit, and like equipment used in the manufacture of semiconductors or liquid crystals.

In the system shown in FIG. 1, the exhaust gas from the CVD (or etching) unit is sent, through the pipe 3, to an exhaust gas treatment unit packed with a treating agent, where it is made harmless on contact with the treating agent and then vented into the open air. The treating agent to be packed into the exhaust gas treatment unit may be the above-described treatment agent used in the unit for removing harmful substances from vent gas.

The method for removing harmful substances in the vent gas of the present invention is not limited to the embodiment shown in FIG. 1. That is, the method of the invention can be effected in the same manner as in conventional dry methods for treating vent gas, except for using the treating agent comprising the alkaline earth metal compound, alkali metal compound, zeolite, and carbonaceous material as an agent to be brought into contact with vent gas containing halogen or halogen compound gas remaining in the pipeline of a cylinder cabinet.

In carrying out the method for removing harmful substances in the vent gas of the present invention, treating conditions including amount of the treating agent to be packed, vent gas flow rate, halogen or halogen compound gas concentration and linear velocity of vent gas, vent gas retention time, and treating temperature and pressure, are decided appropriately depending on the kind of vent gas. Usually, the halogen or halogen compound gas concentration in vent gas is from the threshold limit value up to 10.0%, preferably 0.1% to 1.0%; the linear velocity is 10 m/sec or lower, preferably 1 to 5 n/sec; the retention time of vent gas is 1 to 100 seconds, preferably 10 to 50 seconds; the treating temperature is normal temperature (20 to 30° C.); and the treating pressure is atmospheric pressure.

The present invention will now be illustrated with reference to Example and Comparative Examples, but it should be understood that the invention is not limited thereto.

EXAMPLE 1

A hundred parts by weight of a compounded mixture shown in Table 1 below was kneaded with 100 parts by weight of water and granulated to prepare a granular treating agent having an average particle diameter of 2 mm, an average length of 4 mm, and a specific surface area of 30 $m^2/g$.

In a system shown in FIG. 1 in which a gas is fed from a cylinder cabinet to an CVD (or etching) unit, gas containing $F_2$ or $COF_2$ remaining in the pipeline of the cylinder cabinet was treated as vent gas with the resulting treating agent.

A SUS made adsorption column of 55 mm in diameter and 300 mm in height, equipped with a sampling port and a temperature sensor spaced apart from each other by 50 mm, and having a gas inlet at the top and a gas outlet at the bottom was used as a unit for removing harmful substances from vent gas. The adsorption column was set vertically, and the treating agent was packed therein. The $F_2$ or $COF_2$ remaining in the pipeline of the cylinder cabinet was diluted with nitrogen to a concentration of 0.1 to 10.0% and treated under atmospheric pressure at normal temperature (20° C.). The linear velocity was 10 m/sec or lower, and the gas retention time was between 1 second and 100 seconds. The gas was sampled at the gas inlet, the middle point, and the gas outlet of the column and analyzed by gas chromatography, FT-IR, a gas detection tube, ion chromatography, ICP, etc. The time when the $F_2$ or $COF_2$ concentration in the sample taken from the gas outlet reached the TLV (threshold limit value) was taken as a measure of breakthrough of the treating capacity. The ion chromatography and ICP analysis were conducted on a solution of the sample gas in an aqueous alkali solution.

The test results (treating capacity of the treating agents) are shown in Table 2 below.

COMPARATIVE EXAMPLES 1 TO 7

Vent gas containing $F_2$ or $COF_2$ was treated in the same method as in Example 1, except for using the compounded mixture shown in Table 1. The treating capacity of the treating agents is shown in Table 2.

INDUSTRIAL APPLICABILITY

The method for removing harmful substances in the vent gas of the present invention makes it possible to safely and efficiently render highly reactive halogen or halogen compound gas-containing vent gas harmless, the vent gas remaining in the pipeline of a cylinder cabinet for feeding gas to an etching unit, a CVD unit, etc. used in the manufacture of semiconductors and liquid crystals.

The invention claimed is:

1. A method for removing harmful substances in a vent gas containing a halogen or halogen compound gas remaining in the pipeline of a cylinder cabinet, characterized by bringing the vent gas into contact with a treating agent comprising 60% or more by mass of an alkaline earth metal compound, 1 to 3% by mass of an alkali metal compound, 5 to 37% by mass of zeolite, and 5% by mass or less of a carbonaceous material, wherein the treating agent is granules prepared by mixing the alkaline earth metal compound, the alkali metal compound, the zeolite, and the carbonaceous material each in powder form, kneading the mixture, and granulating the mixture.

2. The method for removing harmful substances in the vent gas according to claim 1, wherein the halogen or halogen compound gas is $F_2$ or $COF_2$.

3. The method for removing harmful substances in the vent gas according to claim 1, wherein the alkaline earth metal compound is at least one member selected from the group consisting of an oxide, a hydroxide, a carbonate, and a sulfate of calcium, magnesium, barium, and strontium.

4. The method for removing harmful substances in the vent gas according to claim 1, wherein the alkali metal compound is at least one member selected from the group consisting of an oxide, a hydroxide, a carbonate, and a sulfate of sodium, potassium, and cesium.

5. The method for removing harmful substances in the vent gas according to claim 1, wherein the alkaline earth metal compound and the alkali metal compound are soda lime.

6. The method for removing harmful substances in the vent gas according to claim 1, wherein the zeolite has fine pores with a pore diameter of 3 Å or more.

7. The method for removing harmful substances in the vent gas according to claim 1, wherein the zeolite is X type zeolite or faujasite type zeolite.

TABLE 1

| | | (unit: % by mass) Comparative Example No. | | | | | | |
|---|---|---|---|---|---|---|---|---|
| | Example 1 | 1 | 2 | 3 | 4 | 5 | 6 | 7 |
| Soda Lime*[1] (ordinary grade) | 90 | 100 | — | — | — | 70 | 90 | 95 |
| Soda Lime*[2] (high specific surface area grade) | — | — | — | — | 100 | — | — | — |
| Zeolite[3] | 5 | — | — | 100 | — | — | — | — |
| Coke*[4] | 5 | — | — | — | — | — | — | — |
| Activated Carbon*[5] | — | — | — | — | — | 30 | 10 | 5 |
| Activated Alumina*[6] | — | — | 100 | — | — | — | — | — |

*[1] average particle size: 260 μm; specific surface area: 2.5 m²/g
*[2] average particle size: 250 μm; specific surface area: 30 m²/g
[3] X type; average pore diameter: 9 Å; average particle size: 250 μm; specific surface area: 300 m²/g
*[4] average particle size: 200 μm; specific surface area: 1100 m²/g
*[5] average particle size: 250 μm; specific surface area: 1200 m²/g
*[6] average particle size: 10 μm; specific surface area: 300 m²/g

TABLE 2

Mass Ratio of Gas Trapped per Unit Mass of Treating Agent

| | | Comparative Example No. | | | | | | |
|---|---|---|---|---|---|---|---|---|
| | Example 1 | 1 | 2 | 3 | 4 | 5 | 6 | 7 |
| $F_2$ | 0.46 | 0.02 | 0.08 | 0.23 | 0.22 | 0.14 | 0.30 | 0.08 |
| $COF_2$ | 0.66 | 0.03 | 0.11 | 0.3 | 0.28 | 0.17 | 0.37 | 0.11 |

8. The method for removing harmful substances in the vent gas according to claim 1, wherein the zeolite is Xtype zeolite or faujasite type zeolite and has fine pores with a pore diameter of 3 Å or more.

9. The method for removing harmful substances in the vent gas according to claim 1, wherein the carbonaceous material is coke and/or activated carbon.

10. The method for removing harmful substances in the vent gas according to claim 1, wherein each of the alkaline earth metal compound, the alkali metal compound, the zeolite, and the carbonaceous material is powder having a particle size of 500 μm or less.

* * * * *